(12) United States Patent
Manen et al.

(10) Patent No.: US 7,894,298 B2
(45) Date of Patent: Feb. 22, 2011

(54) MULTI-COMPONENT SEISMIC DATA PROCESSING

(75) Inventors: Dirk-Jan Van Manen, Oslo (NO); Andrew Curtis, Edinburgh (GB); Johan Robertsson, Oslo (NO)

(73) Assignee: WesternGeco LLC, Houston, TX (US)

( * ) Notice: Subject to any disclaimer, the term of this patent is extended or adjusted under 35 U.S.C. 154(b) by 721 days.

(21) Appl. No.: 10/568,057

(22) PCT Filed: Aug. 16, 2004

(86) PCT No.: PCT/GB2004/003540

§ 371 (c)(1), (2), (4) Date: May 27, 2008

(87) PCT Pub. No.: WO2005/017563

PCT Pub. Date: Feb. 24, 2005

(65) Prior Publication Data

US 2008/0225641 A1     Sep. 18, 2008

(30) Foreign Application Priority Data

Aug. 15, 2003 (GB) ................... 0319201.0

(51) Int. Cl.
*G01V 1/00* (2006.01)
(52) U.S. Cl. .......................................... 367/38; 367/75
(58) Field of Classification Search ............... 367/38, 367/75
See application file for complete search history.

(56) References Cited

U.S. PATENT DOCUMENTS

| 4,686,657 | A |   | 8/1987  | Dellinger et al. |
|-----------|---|---|---------|------------------|
| 4,881,209 | A |   | 11/1989 | Bloomquist et al. |
| 6,128,580 | A | * | 10/2000 | Thomsen ...................... 702/18 |
| 6,714,873 | B2| * | 3/2004  | Bakulin et al. ................. 702/14 |
| 6,785,612 | B1| * | 8/2004  | Zhang .......................... 702/14 |
| 6,820,010 | B1| * | 11/2004 | Sahai et al. .................... 702/18 |

FOREIGN PATENT DOCUMENTS

GB      2 384 447 A      7/2003
WO    02/059647 A1      8/2002

(Continued)

OTHER PUBLICATIONS

Burdick et al Modeling crustal structure through the use of converted phases in teleseismic body-wave forms Bulletin of the Seismological Society of America, vol. 67, 1977, pp. 677-691.

(Continued)

*Primary Examiner*—Mark Hellner
(74) *Attorney, Agent, or Firm*—Vincent Loccisano; James McAleenan; Brigid Laffey (57) ABSTRACT

There is described a method of moveout or velocity analysis of seismic signals using the steps of obtaining such signals 5 from a plurality of receivers, identifying receiver functions within the acoustic signals, analyzing said receiver functions for velocity or moveout characteristics, using the result of said analyzing step to determine, properties of multiple layers of earth located below said 10 receivers. The analyses can involve the use of representation of the traveltime differences as approximated power series of slowness or horizontal distances. The method is the first to comprehensively deal with a multi-layered earth or velocity model.

19 Claims, 7 Drawing Sheets

FOREIGN PATENT DOCUMENTS

WO    03/062858 A1    7/2003

OTHER PUBLICATIONS

Dix Seismic velocities from surface measurements Geophysics, vol. 20, No. 1, 1955, pp. 68-86.

Ghosh et al Divergent and asymptotic nature of the time-offset Taner-Koehler series in reflection seismics Geophysics, vol. 67, No. 6, 2002, pp. 1913-1919.

Gurrola et al The use of velocity spectrum for stacking receiver functions and imaging upper mantle discontinuities Geophys. J. Int., vol. 117, 1994, pp. 427-440.

Langston Structure under Mount Rainier, Washington, inferred from teleseismic body waves J. Geophys. Res., vol. 84, 1979, pp. 4749-4762.

Neidell et al Semblance and other coherency measures for multichannel data Geophysics, vol. 36, No. 3, 1971, pp. 482-497.

Paulssen et al The crustal structure from teleseismic P-wave coda-I. Method Geophys. J. Int., vol. 112, 1993, pp. 15-25.

Phinney Structure of the earth's crust from spectral behavior of long-period body waves J. Geophys. Res., vol. 69, 1964, pp. 2997-3017.

Ryberg et al Receiver function arrays: a reflection seismic approach Geophys. J. Int., vol. 141, 2000, pp. 1-11.

Taner et al Velocity spectra-digital computer derivation and applications of velocity functions Geophysics, vol. 34, No. 6, 1969, pp. 859-881.

Tessmer et al Common reflection point data-stacking technique for converted waves Geophysical Prospecting, vol. 36, 1988, pp. 671-688.

\* cited by examiner

MULTI-COMPONENT SEISMIC DATA PROCESSING

The present invention generally relates to apparatus and methods, for processing multi-component (3C/4C) seismic data based on the use of receiver functions, more specifically two-dimensional receiver functions. It also pertains to the use of receiver functions to process and interpret seismic signals to derive an earth image away from the near-surface structure at the receiver location.

BACKGROUND OF THE INVENTION

The processing and interpretation of multicomponent (3C/4C) seismic data, acquired directly at the seafloor or during 3C land seismic surveys is compromised by the effects that the shallow subsurface has on the deeper reflected wavefield. The near surface is generally associated with low, laterally varying shear wave velocities and on land, the P-wave velocity can also be low. These properties often lead to large P- and S-wave traveltime perturbations in the deeper reflected wavefield which vary from receiver to receiver. In addition, there are suggestions that scattering and an elastic attenuation (especially shear) impacts amplitudes and recorded waveforms as well.

The receiver function methodology has it roots in earthquake seismology, where it was developed to investigate the structure of the crust and upper mantle using multicomponent teleseismic body wave data. Certain aspects of receiver functions are described for example by T. Ryberg and M. Weber in Geophys. J. Int. 141 (2000), 1-11. Reference to aspects of receiver function can also be found in the published patent applications GB 2384557 and WO 02/059647.

While trying to image discontinuities in upper mantle using receiver functions, it was realised that the change in the traveltime difference between the P-wave and the PS-converted wave, as a function of the angle of incidence, could no longer be neglected. T. Ryberg and M. Weber proposed to calculate a velocity spectrum stack (VSS) based on the change in the traveltime difference (hereafter called moveout) in a single layer to find optimal velocities for stacking of receiver functions. Although this approach gives good results when the structure is relatively homogeneous above the converting interface, it lacks a theoretical basis when applied to layered media with significant other discontinuities above the converting interface, i.e. when ray bending is likely to produce significant deviations from the traveltime difference equation for a single layer. This was partly recognised and, subsequently, it was suggested to substitute the average vertical P- and S-wave slowness for a stack of layers, into the equation for a single layer. It was also proposed to circumvent this problem by assuming a reference model (providing an initial vp(z) and vs(z)) and a corresponding one-parameter family of related models by multiplying the reference model by a fraction close to one, and obtain the difference in traveltime as a function of slowness by ray-tracing through the perturbed reference model. This approach severely restricts the number of free parameters.

On the other hand, normal moveout correction (NMO), velocity analysis and stacking of multichannel data has a long history in exploration and production seismic and the theory is well developed for horizontally layered media. It was demonstrated how to derive a power series approximation of the squared reflection traveltime as a function of even powers of offset (i.e. of the form: $t^2 \approx c_1 + c_2 \cdot x^2 + c_3 \cdot X^4 + \ldots$, where t denotes two-way traveltime, x denotes offset and the coefficients depend on layer thicknesses and velocities of the medium). Hyperbolic approximations were used, truncating the infinite series after the second term and defined the rms-velocity as the square-root of the inverse of coefficient $c_2$. It is also known that the slope of the $x^2-t^2$ curve at x=0 yields the inverse of the squared rms-velocity and how from the rms-velocity at two consecutive depth levels the interval velocity between them can be calculated. Taner and Koehler in: Geophysics 34 (1969), 859-881 also introduced the velocity spectrum stacking technique using a multichannel coherence measure called semblance. The work by Taner and Koehler was generalised for PS-converted waves by Tessmer and Behle in Geophys. Prosp. 36 (1988), 671-688, who also derive a Dix-Krey type formula, relating rms-velocities for PS-converted waves to products of P- and S-wave interval velocities in each layer.

In view of the above state of art, it is an object of the present invention to extend and improve the use of receiver functions to process and interpret seismic data to derive images of an earth. It is further object of the invention to determine velocities or velocity models from such receiver functions.

SUMMARY OF THE INVENTION

This invention describes systematic approximations of the difference in traveltime between a seismic signal in an unchanged mode and a corresponding mode-converted signal, such as P-waves (or S-waves) and PS-waves (or SP-waves), converted upon reflection or transmission at a particular interface in a horizontally layered medium or a multi-layered earth model. As such, the relations of the present invention can be used to approximate the moveout of events in receiver functions, which correspond to traveltime differences between non-converted and converted waves. The receiver function can thus be corrected for moveout in the slowness domain or in the time-space domain. The moveout correction overcomes limitations of known attempts to use receiver function to interpret an earth, which attempts were limited to shallow subsurface layers or cases of low-velocity layers (or vertical or near-vertical raypaths).

The receiver functions are well known seismology but rarely used in seismic operations related to the exploration and monitoring of hydrocarbon reservoirs. The receiver function are broadly defined as the result of a deconvolution or crosscorrelation between mode-converted events at a receiver location, thereby representing an ideally source-independent response of the earth layers beneath the receiver or more generally beneath the location where the deconvolution or crosscorrelation is performed.

Receiver function can be derived in a variety of ways mainly distinguished by the use of different components of the wavefield or a different set of coordinates. They include:

the deconvolution or crosscorrelation of vertical and horizontal components (both in-line and cross-line) of particle displacement/velocity/acceleration;

the deconvolution or crosscorrelation of vertical and radial/transverse components (or any component resulting from rotation of linearly independent horizontal measurements into a particular coordinate system);

the deconvolution or crosscorrelation in the LQT system often applied in seismology with the L component (pointing in the direction of propagation of an incoming P-wave, below the free-surface) and the Q- and T-components (mutually orthogonal and orthogonal to the L component, hence pointing in the direction of particle motion of the SV and SH-waves respectively);

the deconvolution or crosscorrelation of any components resulting from rotation of 3 mutually orthogonal measurements of particle motion in a particular coordinate system, with the aim of better separating P- and S-waves before calculating the receiver function;

the deconvolution or crosscorrelation of any P- and S-wave quantities, either measured directly (e.g. using special receiver configurations measuring divergence or curl, or special sensors (e.g. a pressure sensor etc.) or resulting from wavefield decomposition of mutually orthogonal measurements;

the deconvolution or crosscorrelation of complete recordings as well as selected parts of recordings;

the equivalents of deconvolution and crosscorrelation in the frequency (or frequency-horizontal wavenumber or frequency-slowness) domain;

2D- or 3D-deconvolution/crosscorrelation involving 1- or 2-spatial axes in the deconvolution/correlation process; or deconvolution or crosscorrelation of P- and PS-converted waves as well as S- and SP-converted waves (i.e. all combinations of converted and unconverted waves)

The receiver function deconvolution/crosscorrelation is not limited to a physical surface: it may be done everywhere in the medium (e.g. as part of a wavefield extrapolation procedure).

The receiver function deconvolution/crosscorrelation procedure of the present invention is not necessarily limited to taking pairs of traces from the same receiver, it can be the result of a combination of particular traces containing P- and S-wave events from different receiver locations.

In a first aspect the traveltime difference is expanded into increasing even powers of slowness, leading to a generalised small-slowness approximation of receiver function moveout in the time-slowness domain. This result is more general than previous results by Ryberg and Weber (2000) since it applies to a stack of layers and contains their results as the special case of a single layer over a halfspace. A pseudo rms-velocity is defined and this leads naturally to a Dix-Krey type relation for receiver functions, relating the pseudo rms-velocities for two consecutive interfaces to the product of the P- and S-wave interval velocity between them.

In a second aspect, a related expansion of the squared traveltime difference is made into increasing even powers of the difference in horizontal travel distance between the P- and PS-converted wave (e.g., $dt^2 = c_1 + c_2 \cdot dx^2 + c_3 \cdot dx4 + \ldots$, where dt denotes the difference in traveltime between the PS-converted wave and the P-wave from a particular interface, whereas dx denotes the difference in offset of emergence between the P- and PS-wave). In connection with this expansion, a new type of receiver function is also introduced, formed by two-dimensional deconvolution of (x,t) domain vertical component data (i.e. P-waves) out of the corresponding (x,t) radial component data (PS-waves). This 2D-receiver function, because of the added deconvolution in the spatial direction, gives precisely the time-lag between the PS-wave and the P-wave as a function of the distance-lag between them. The second (truncated) expansion hence can be used to NMO correct the new type of receiver function. Synthetic data generated with a reflectivity code is used to illustrate the moveout approximations and the new type of receiver function.

The derived series approximations (and corresponding two-term truncations) of traveltime differences between PS-converted waves and P-waves from interfaces in horizontally layered media, being either a function of slowness or a function of the difference in horizontal distance traveled by the two phases, enable velocity analysis and subsequent normal moveout correction of events in receiver functions. The derived Dix-Krey type formulas for receiver functions relate the (pseudo) rms-velocities for two consecutive interfaces in a layered earth to the product of P- and S-wave interval velocities between them. A new kind of receiver function is proposed, calculated by two-dimensional deconvolution of (x,t) domain vertical component data out of (x,t) radial component data, which gives information about the traveltime difference between P- and PS-converted phases as a function of the difference in horizontal distance traveled by those phases. The second moveout approximation applies to events in this new type of receiver function.

Aspects of the invention further include a method of calculating the moveout (or change as a function of slowness) of the traveltime difference between a PS-converted wave and a P-wave, reflected/transmitted from the same interface in a layered earth, by expanding the traveltime difference into an infinite series of increasing, even, powers of slowness. This approximation can be made increasingly accurate by including more terms in the expansion. Coefficients of higher-order terms can be obtained by regression analysis of picked traveltime differences in the $(\tau,p)$ domain receiver functions.

Another aspect of the invention is a two-term truncation of the series expansion of the traveltime difference between a PS-converted wave and a P-wave reflected/transmitted from the same interface and the association of the coefficient multiplying the second term with a pseudo rms-velocity. This approximation expresses the moveout of the traveltime differences a in terms of a single profile or parameter of scalar quantities with depth rather than two profiles such as the P- and S-wave velocity profiles $Vp(z)$ and $Vs(z)$ Yet another aspect of the invention is a method of velocity analysis of receiver functions calculated by deconvolution or crosscorrelation of vertical component data (or any P-wave quantity) with radial component data (or any S-wave quantity) in the $(\tau,p)$ domain, which uses the above two-term approximation and any multichannel coherency measure, similar to the velocity analysis method proposed by Taner and Koehler (1969) for P-wave data or other known methods.

Yet another aspect of the invention is a method of processing the (pseudo-) velocities produced by the method of receiver function velocity analysis, as described above, to obtain the product of P- and S-wave propagation velocities in each layer of the medium, using the Dix-Krey type relations developed for the $(\tau,p)$ domain receiver functions.

Yet another aspect of the invention is method of correcting the events in a $(\tau,p)$ domain receiver function for the NMO of the traveltime difference using the product of the P- and S-wave interval velocities obtained using the method described above and a priory knowledge of either the P- or S-wave velocity or velocity ratio in each layer and theoretical expressions or ray-tracing.

Another aspect of the invention is a method of calculating two-dimensional (2D) receiver functions, by 2D (stabilised) deconvolution or crosscorrelation of (x,t) domain vertical component data (or any P-wave quantity) with the corresponding (x,t) domain radial component data (or any S-wave quantity).

Yet another aspect of the invention is a method of calculating the moveout (or change as a function of the difference in horizontal distance traveled) of the traveltime difference between a PS-converted wave and a P-wave reflected/transmitted from the same interface, by expanding the squared traveltime difference into an infinite series of increasing powers of the difference in horizontal distance traveled by both phases. Since the result is an asymptotic expansion (around $dx=0$), including more terms in the expansion does not necessarily improve the accuracy. The expansion is truncated one term before the smallest which guarantees that the error in the expansion is of the order of the first neglected term.

Yet another aspect of the invention is a method of calculating a similar asymptotic expansion as above around a different expansion point (e.g. dx=250 m) while maintaining the possibility to interpret the first few coefficients as the vertical incidence traveltime and the rms-velocity respectively.

Yet another aspect of the invention is a two-term truncation of the series expansion of the squared traveltime difference as a function of increasing even powers of the difference in horizontal distance traveled by the two phases and the association of the coefficient multiplying the second term with a rms-velocity.

Yet another aspect of the invention is a method of velocity analysis of the 2D-receiver functions formed by two-dimensional deconvolution using the two-term truncation of the traveltime difference as a function of the difference in horizontal distance traveled and a coherency measure, similar to the velocity analysis method proposed by Taner and Koehler (1969) for P-wave data.

Yet another aspect of the invention is a method of processing the velocities produced by the method of receiver function velocity analysis to obtain the product of P- and S-wave propagation velocities in each layer of the medium, using the Dix-Krey type relations developed for the (x,t) domain two-dimensional receiver functions.

Yet another aspect of the invention is a method of correcting the events in a two-dimensional receiver function for the NMO of the traveltime difference using the product of the P- and S-wave interval velocities obtained using the above-described method and a priori knowledge of either the P- or S-wave velocity or velocity ratio and theoretical expressions or ray-tracing.

The methods of the invention, including the moveout corrected receiver functions or the velocities derived from the related Dix-Krey relations, can be applied to many known seismic data processing methods, including velocity analysis, moveout correction (NMO and/or DMO), stacking and pre- or post-stack migration.

These and other aspects of the invention will be apparent from the following detailed description of non-limitative examples and drawings.

DETAILED DESCRIPTION AND EXAMPLES

Series Expansion of the Traveltime Difference as a Function of Slowness

Figure 1:
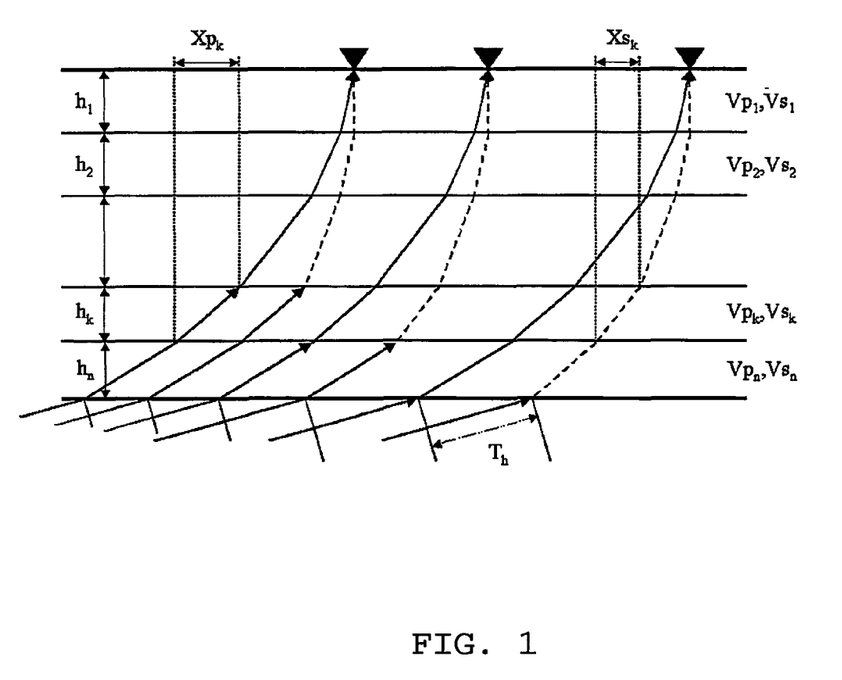
FIG. 1 is a schematic illustration of the phases and raypaths involved in the seismological receiver function setting. A plane P-wave is incident on a stack of n horizontal layers from below and mode-converts to Shear at discontinuities within, and at the base of the stack. P-waves are denoted by solid lines, S-waves by dashed lines. The data from each multicomponent station is processed separately and the extra time $T_h$ is treated implicitly in the traveltime difference calculation.

It is well known from global seismology that the difference in traveltime between a P-wave incident on a stack of n horizontal layers from below and the corresponding PS-wave, converted upon transmission into the stack, can be written:

$$dt = \sum_{k=1}^{n} h_k \left( \sqrt{Vs_k^{-2} - p^2} - \sqrt{Vp_k^{-2} - p^2} \right), \quad (1)$$

where $h_k$, $Vs_k$ and $Vp_k$ denote the thickness, shear and compressional wave velocity of layer k respectively, and p the slowness of the incident plane-wave. Note that this formula implicitly takes into account the extra time ($T_h$) it takes the incident plane-wave to reach the horizontally offset PS-conversion at the base of the stack. Hence this formula can be used to compare the arrival time of plane P- and PS-converted waves with the same slowness, arriving at the same receiver, as is normally done in seismology (see FIG. 1). Equation (1) contains terms of the form: $(1-p^2 v^2)^{1/2}$, where v can denote either the P- or S-wave velocity. Such terms can be expanded into a Taylor series as follows:

$$(1 - p^2 v^2)^{\frac{1}{2}} = \sum_{j=0}^{\infty} q_j (p^2 v^2)^j = 1 - \frac{1}{2}(p^2 v^2) - \frac{1}{8}(p^2 v^2)^2 - \frac{1}{16}(p^2 v^2)^3 - \ldots, \quad (2)$$

where the coefficients $q_j$ are given by:

$$q_0 = 1, \quad (3)$$

$$q_j = \frac{\frac{1}{2}\left(\frac{1}{2}-1\right)\left(\frac{1}{2}-2\right) \times \ldots \times \left(\frac{1}{2}-j+1\right)}{j!} (-1)^j.$$

Substituting equation (2) into equation (1), the traveltime difference can be written:

$$dt = \sum_{j=0}^{\infty} q_j \sum_{k=1}^{n} h_k (Vs_k^{2j-1} - Vp_k^{2j-1})(p^2)^j. \quad (4)$$

Equation (4) is an expansion of the traveltime difference between plane P- and PS-converted waves through an n-layered medium in increasing even powers of slowness. Note that the accuracy of the expansion is directly related to the accuracy of the substituted Taylor series approximation (equation 2), which means that the product $p^2 v^2$ should be small (at least smaller than 1, which means that the waves should be nowhere evanescent) throughout the stack. Therefore the product of the highest P-velocity and the slowness determine the accuracy of equation (4). If it is assumed that the slowness is small throughout the stack, we can truncate the infinite series given by eq. (4) after the second term and neglect terms of fourth order in slowness and higher. This gives the small-slowness, or short-spread approximation:

$$dt = \sum_{k=1}^{n} h_k (Vs_k^{-1} - Vp_k^{-1}) + \frac{1}{2} \sum_{k=1}^{n} h_k (Vp_k - Vs_k) p^2. \quad (5)$$

The first term in equation (5) is simply the difference in traveltime between a vertically incident P- and S-wave (p=0) through the stack of layers. The second term, multiplying $p^2$, is not simply interpretable since it contains products of layer thicknesses and differences in velocities and has units [m²/s]. However, maintaining the analogy with NMO corrections developed in exploration and production seismic, we call this the pseudo rms-velocity. Thus the traveltime difference at vertical incidence $dt_0$ and the pseudo rms-velocity $v_{rms}$ respectively can be defined as:

$$dt_0 = \sum_{k=1}^{n} h_k (Vs_k^{-1} - Vp_k^{-1}), \quad (6a)$$

$$\tilde{v}_{rms} = \frac{1}{2} \sum_{k=1}^{n} h_k (Vp_k - Vs_k). \quad (6b)$$

Note that for a single layer, the short-spread approximation given in equation (5) reduces to the equation given by Ryberg and Weber (2000). Hence, their result is a special case of the small-slowness relation proposed here. Note also that although equation (1) originates from earthquake seismology and is usually only applied in a transmission setting, it is also valid in a reflection setting, where plane P- and PS-waves are considered, reflected and mode-converted at the same interface in a horizontally layered medium and recorded at the same receiver.

A Dix-Krey Relation for Receiver Function Pseudo rms-Velocities

The definition of a pseudo rms-velocity in equation (6b) allows the derivation of a Dix-Krey type formula that relates the pseudo rms-velocities to the product of P- and S-wave interval velocities, as will be shown below. A similar analysis as Tessmer and Behle (1988) is applied and the thickness $h_k$ of layer k is expressed in terms of the one-way vertical traveltimes $\tau^p_k$ and $\tau^s_k$ and interval velocities in that layer:

$$h_k = \frac{1}{2}(Vp_k \tau^p_k + Vs_k \tau^s_k). \quad (7)$$

Also, the ratio of vertical one-way traveltimes equals the inverse of the ratio of interval velocities:

$$\frac{\tau^p_k}{\tau^s_k} = \frac{Vs_k}{Vp_k}. \quad (8)$$

If equation (7) is subsituted into the definition of the pseudo rms-velocity (eq. 6b) and the identity in eq. (8) is used, one can derive the following expression for the pseudo rms-velocity at layers n and n−1:

$$\tilde{v}^n_{rms} = \frac{1}{2} \sum_{k=1}^{n} (\tau^s_k - \tau^p_k) \cdot Vs_k Vp_k, \quad (9a)$$

$$\tilde{v}^{n-1}_{rms} = \frac{1}{2} \sum_{k=1}^{n-1} (\tau^s_k - \tau^p_k) \cdot Vs_k Vp_k. \quad (9b)$$

Subtracting equation (9b) from equation (9a), one arrives at:

$$Vs_n Vp_n = 2 \cdot \frac{\tilde{v}^n_{rms} - \tilde{v}^{n-1}_{rms}}{(\tau^s_n - \tau^p_n)}. \quad (10)$$

Finally, using that the difference in the vertical one-way S- and P-wave traveltime through layer n is equal to the difference in vertical incidence traveltime differences between layer n and layer n−1:

$$(\tau_k^s - \tau_k^p) = dt_0^n - dt_0^{n-1}, \quad (11)$$

one arrives at a Dix-Krey type of relation that relates the pseudo rms-velocities to the product of P- and S-wave interval velocities:

$$Vs_n Vp_n = 2 \cdot \frac{\tilde{v}_{rms}^n - \tilde{v}_{rms}^{n-1}}{dt_0^n - dt_0^{n-1}}. \quad (12)$$

Equation (12) says that the product of P- and S-wave interval velocities in layer n is twice the ratio of the differences in pseudo rms-velocities and vertical incidence traveltime differences. Equation (12) can be verified by directly substituting the definitions of the pseudo rms-velocities and vertical incidence traveltime differences (i.e. eq. 6a,b).

Figure 2:
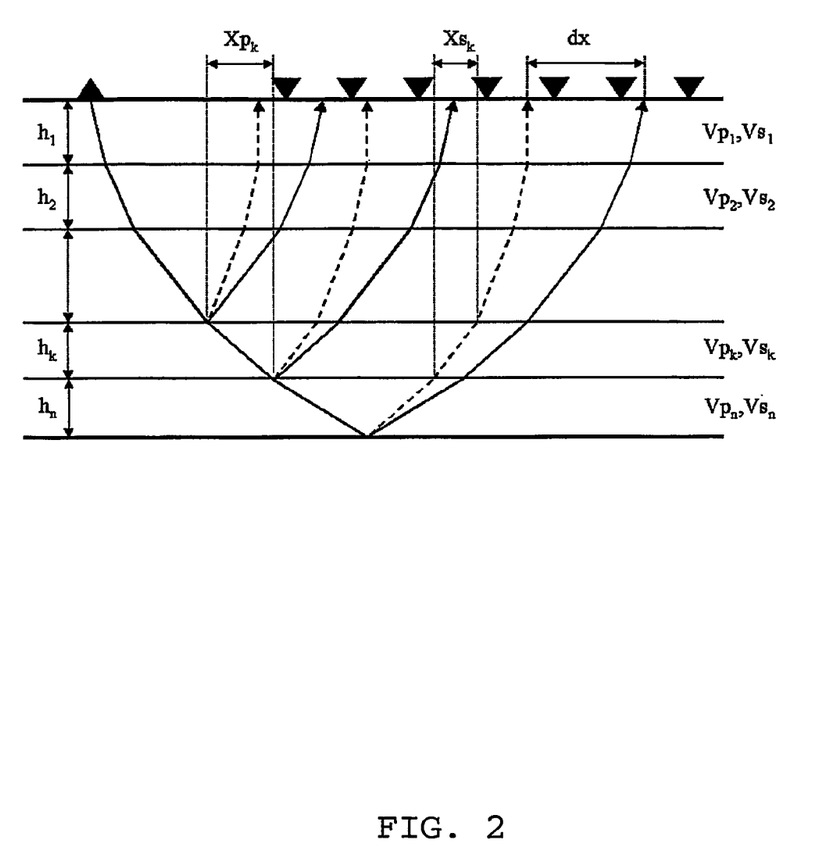
FIG. 2 is a schematic illustration of the phases and raypaths involved in the reflection seismic receiver function setting. A P-wave is incident on a stack of n horizontal layers from above and mode-converts to Shear upon reflection at discontinuities within and at the base of the stack. P-waves are denoted by solid lines, S-waves by dashed lines. The data is recorded on an array of equidistant multicomponent receivers and the difference dx in horizontal distance traveled by the P- and PS-converted wave from the same reflection/conversion point can be treated explicitly, analogous to the difference in traveltime between the two phases.

Expansion of the Traveltime Difference as a Function of the Difference in Horizontal Distance Traveled In the previous sections, the horizontal distance between the point of P-wave transmission and PS-conversion at the base of the stack, but emerging at the same surface location, was taken into account implicitly in the derivation of the traveltime difference (equation 1). The main (historical) reason for this is that it allows accurate comparison of P- and PS-wave traveltimes at a single multicomponent station (see FIG. 1). However, when the multicomponent data are recorded on a densely spaced array of receivers, such as in exploration and production seismic, the P- and PS-wave energy originating from the same location on the converting interface are both recorded, although at horizontally offset locations in the receiver array. This allows us to consider the difference in traveltime and in horizontal travel distance explicitly for an array of receivers (compare FIG. 1 and FIG. 2)

Using elementary trigonometric relations and Snell's law, the explicit difference in traveltime between a plane P- and PS-wave of slowness p, transmitted and converted at the same location at the base of layer n, can be written (where $h_i$, $Vs_i$ and $Vp_i$ denote the thickness, shear and compressional wave velocity of layer i respectively):

$$dt = \sum_{k=1}^{n} (Ts_k - Tp_k) = \sum_{k=1}^{n} \left[ \frac{h_k}{Vs_k \sqrt{1 - p^2 Vs_k^2}} - \frac{h_k}{Vp_k \sqrt{1 - p^2 Vp_k^2}} \right]. \quad (13)$$

Similarly, the difference in horizontal distance traveled can be written:

$$dx = \sum_{k=1}^{n} (Xp_k - Xs_k) = \sum_{k=1}^{n} \left[ \frac{h_k Vp_k}{\sqrt{1 - p^2 Vp_k^2}} - \frac{h_k Vs_k}{\sqrt{1 - p^2 Vs_k^2}} \right]. \quad (14)$$

Now, following the analysis of Tessmer and Behle (1988), both dt and dx are expanded into infinite series of even powers of p. Hereby the Taylor series expansion of the function $(1-p^2v^2)^{1/2}$ is used, where v can denote both the P- and S-wave velocity.

$$(1 - p^2 v^2)^{-\frac{1}{2}} = \sum_{j=1}^{\infty} q_j (p^2 v^2)^{j-1} \quad (15)$$

$$= 1 + \frac{1}{2}(p^2 v^2) + \frac{1 \times 3}{2 \times 4}(p^2 v^2)^2 + \frac{1 \times 3 \times 5}{2 \times 4 \times 6}(p^2 v^2)^3 + \ldots,$$

where the coefficients $q_j$ are given by:

$$q_1 = 1, \; q_j = \frac{1 \times 3 \times \ldots \times (2j-3)}{2 \times 4 \times \ldots \times (2j-2)}. \quad (16)$$

Note that this expansion is the inverse of the expansion used in the previous sections (see equation 2). Thus substituting equation (15) into equations (13) and (14) for both terms containing P- and S-velocities to obtain infinite series for dt and dx results in:

$$dt = \sum_{j=1}^{\infty} q_j \sum_{k=1}^{n} h_k (Vs_k^{2j-3} - Vp_k^{2j-3})(p^{2j-2}), \quad (17a)$$

$$dx = \sum_{j=1}^{\infty} q_j \sum_{k=1}^{n} h_k (Vs_k^{2j-1} - Vp_k^{2j-1})(p^{2j-1}). \quad (17b)$$

To simplify the appearance of equations (17a,b) and subsequent derivations, the following coefficients are defined:

$$a_m = \sum_{k=1}^{n} h_k (Vs_k^{2m-3} - Vp_k^{2m-3}), \quad (18a)$$

$$b_m = -q_m a_{m+1}, \quad (18b)$$

$$\gamma_m = q_m a_m. \quad (18c)$$

Using these, equations (17a,b) become:

$$dt = \sum_{k=1}^{\infty} \gamma_k p^{2k-2}, \quad (19a)$$

$$dx = p \sum_{k=1}^{\infty} b_k p^{2k-2}. \quad (19b)$$

Equations 19a,b have the same form as Taner and Koehler (1969) derived for the traveltime and offset of a P-wave reflection in a horizontally layered medium and as Tessmer and Behle (1988) found for the traveltime and offset of PS-converted waves. This suggests that it is possible to apply the same methodology as they have done to find an expansion of the square of the traveltime difference into increasing even powers of the difference in horizontal travel distance. Such an expansion would be useful if a new kind of receiver function could be obtained, where PS-converted waves are shifted both in time and space relative to the P-wave, measuring the traveltime difference as a function of the difference in horizontal distance traveled by both phases. But this new receiver function is exactly the result of applying a two-dimensional (2D) deconvolution of the (x,t) domain vertical component data from the (x,t) domain horizontal component data. The 2D or 3D deconvolution using one or two spatial axes yields directly the distance lags dx in the same way as the deconvolution over time yields the time-lags dt. Thus, the objective is to express the traveltime difference dt as:

$$dt^2 = c_1 + c_2 \cdot dx^2 + c_3 \cdot dx^4 + c_4 \cdot dx^6 + \ldots, \quad (20)$$

The explicit form of equation (20) can be found by squaring the power series for dt (equation 19a), successive higher even powers of dx (equation 19b) and ordering terms of equal powers in slowness p. Starting by squaring dx:

$$dx^2 = \left(p \sum_{k=1}^{\infty} b_k p^{2j-2}\right)^2 = p^2 \left(\begin{array}{c} b_1 + b_2 p^2 + b_3 p^4 + \\ b_4 p^6 + \ldots \end{array}\right)^2 \quad (21)$$

$$= p^2 \left(\begin{array}{c} b_1^2 + (b_1 b_2 + b_2 b_1) p^2 + (b_1 b_3 + b_2^2 + b_3 b_1) p^4 + \\ (b_1 b_4 + b_2 b_3 + b_3 b_2 + b_4 b_1) p^6 + \ldots \end{array}\right)$$

$$= p^2 \sum_{k=1}^{\infty} B_{k1} p^{2k-2},$$

where, $$B_{k1} = b_1 b_k + b_2 b_{k-1} + \ldots + b_{k-1} b_2 + b_k b_1. \quad (22)$$

The higher, even powers of this series can be found by recursively applying equation (22) to find the coefficients. This leads to the following result:

$$dx^{2n} = \sum_{k=1}^{\infty} B_{kn} p^{2k-2}, \quad (23)$$

where, $$B_{kn} = B_{11} B_{k,n-1} + B_{21} B_{k-1,n-1} + \ldots + B_{k-1,1} B_{2,n-1} + B_{k1} B_{1,n-1}. \quad (24)$$

Note that the coefficients $B_{kn}$ have to be calculated recursively since they contain coefficients $B_{\ldots,n-1}$. The same methodology can also be applied to find the square of dt to find:

$$dt^2 = \left(\sum_{k=1}^{\infty} A_k p^{2k-2}\right) \quad (25)$$

$$= c_1 + c_2 \cdot \underbrace{\left(p^2 \sum_{k=1}^{\infty} B_{k1} p^{2k-2}\right)}_{dx^2} + c_3 \underbrace{\left(p^4 \sum_{k=1}^{\infty} B_{k2} p^{2k-2}\right)}_{dx^4} +$$

$$c_4 \underbrace{\left(p^6 \sum_{k=1}^{\infty} B_{k3} p^{2k-2}\right)}_{dx^6} + c_5 \ldots,$$

where, $$A_k = \gamma_1 \gamma_k + \gamma_2 \gamma_{k-1} + \ldots + \gamma_{k-1} \gamma_2 + \gamma_k \gamma_1. \quad (26)$$

Hence, written out up to $6^{th}$ order in p, equation (25) becomes:

$$A_1 + A_2 p^2 + A_3 p^4 A_4 p^6 + \ldots = c_1 + c_2 B_{11} p^2 + (c_2 B_{21} + c_3 B_{12}) p^4 + (c_2 B_{31} + c_3 B_{22} + c_4 B_{13}) p^6 + \ldots$$

Thus the first two coefficients, using equations (18a-c), are $$c_1 = A_1 = \gamma_1^2 = (q_1 a_1)^2 = \left(\sum_{k=1}^{n} h_k \left(\frac{1}{Vs_k} - \frac{1}{Vp_k}\right)\right)^2 \equiv dt_0^2, \quad (27a)$$

$$c_2 = \frac{A_2}{B_{11}} = \frac{2\gamma_1 \gamma_2}{b_1^2} = \frac{a_1}{a_2} = \frac{\sum_{k=1}^{n} h_k \left(\frac{1}{Vs_k} - \frac{1}{Vp_k}\right)}{\sum_{k=1}^{n} h_k (Vs_k - Vp_k)} \equiv \frac{1}{v_{rms}^2}. \quad (27b)$$

Note that coefficient $c_1$ (equation 27a) can be directly interpreted as the square of the difference in traveltime between the P- and PS-converted wave at vertical incidence (p=0 s/m). The coefficient $c_2$ can not be interpreted so easily, although the numerator is equal to $dt_0$, but it has the same form as was found by Tessmer and Behle for PS-converted waves and hence it can be equaled to the inverse of the square of an rms-velocity.

A Dix-Krey Relation for Reflection Seismic Receiver Functions

Analogous to the derivation of a Dix-Krey type relation for the two-term traveltime difference approximation in the slowness domain, Dix-Krey type relations can also be derived for the approximations of the traveltime difference as a function of the difference in horizontal distance traveled by the P- and PS-wave. This is the topic of the current section. As will be seen, the result will relate the rms-velocities defined in the previous section to the products of P- and S-wave interval velocities. Starting from the squared rms-velocity:

$$v_{rms}^2 = \frac{\sum_{k=1}^{n} h_k (Vs_k - Vp_k)}{dt_0^2}. \quad (28)$$

and proceeding by substituting equation (7) for the thickness of a layer k and the ratio of one-way vertical traveltimes (equation 8) into equation (28) results in:

$$\sum_{k=1}^{n} h_k (Vs_k - Vp_k) = \sum_{k=1}^{n} \frac{1}{2} (Vp_k \tau_k^p + Vs_k \tau_k^s)(Vs_k - Vp_k) \quad (29)$$

$$= \sum_{k=1}^{n} (\tau_k^p - \tau_k^s) \cdot Vs_k Vp_k.$$

Hence, combining equation (28) and (29), for layer n and n−1 respectively gives:

$$dt_0^n v_{rms,n}^2 = \Sigma_{k=1}^{n} (\tau_k^p - \tau_k^s) \cdot Vp_k Vs_k, \quad (30a)$$

$$dt_0^{n-1} v_{rms,n-1}^2 = \Sigma_{k=1}^{n-1} (\tau_k^p - \tau_k^s) \cdot Vp_k Vs_k. \quad (30b)$$

Subtracting equation (30b) from equation (30a) leads to the product of P- and S-wave interval velocities in layer n:

$$Vp_n Vs_n = \frac{dt_0^n v_{rms,n}^2 - dt_0^{n-1} v_{rms,n-1}^2}{(\tau_n^p - \tau_n^s)}. \quad (31)$$

Now finally, using that:

$$(\tau_n^p - \tau_n^s) = dt_0^n - dt_0^{n-1}, \quad (32)$$

equation (31) can be written:

$$Vp_n Vs_n = \frac{dt_0^n v_{\text{rms},n}^2 - dt_0^{n-1} v_{\text{rms},n-1}^2}{(dt_0^n - dt_0^{n-1})}. \quad (33)$$

Equation (33) is the desired Dix-Krey type relation. It shows how the product of P- and S-wave interval velocities for a layer k, can be calculated once the rms velocities and the vertical incidence time differences for that layer and the previous layer are known. Equation (33) has exactly the same form as found previously for PS-converted waves by Tessmer and Behle (1988). Note however that the vertical incidence traveltime differences and rms velocities are defined differently, as shown in the previous section.

NUMERICAL EXAMPLES

In the following it is illustrated how the derived approximations may be used with some numerical examples.

Example 1

Moveout Correction Using the Two-Term Approximation in the Slowness Domain

Figure 3:
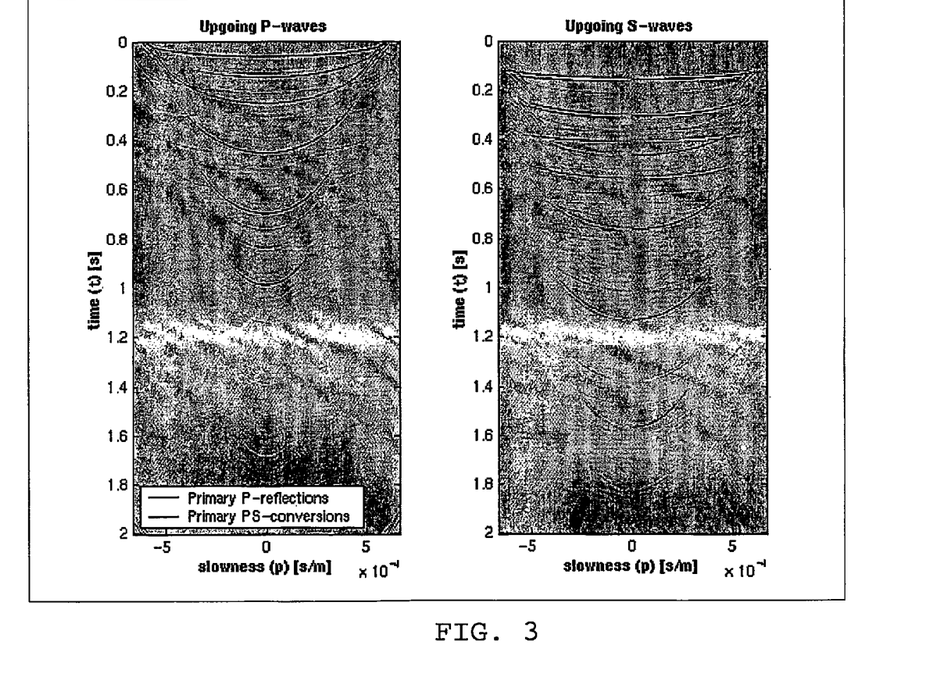
FIG. 3 shows pre-processed reflectivity data for the six-layer over a halfspace model (medium properties in Table 1 below). The primary P- and PS-converted waves have been identified by ray-tracing through the model and are indicated in blue and red respectively. This is the data input for receiver function calculation in the slowness domain.

Synthetic data was calculated using a 2D reflectivity code for a horizontally layered model consisting of 6 homogeneous layers overlying a halfspace. The medium properties are summarised in Table 1. In the synthetic experiments, 801 receivers were positioned symmetrically about the source position with a receiver-receiver spacing of 3.125 m. Thus, the maximum source-receiver offset considered here is 1250 m. The sampling rate was 2 ms. The source in the modeling was a P-wave point source, positioned on the surface, emitting a 50 Hz Ricker wavelet. As pre-processing step the data were transformed to the time-slowness ($\tau$,p) domain. The pre-processed reflectivity data is shown in FIG. 3.

Figure 4A:
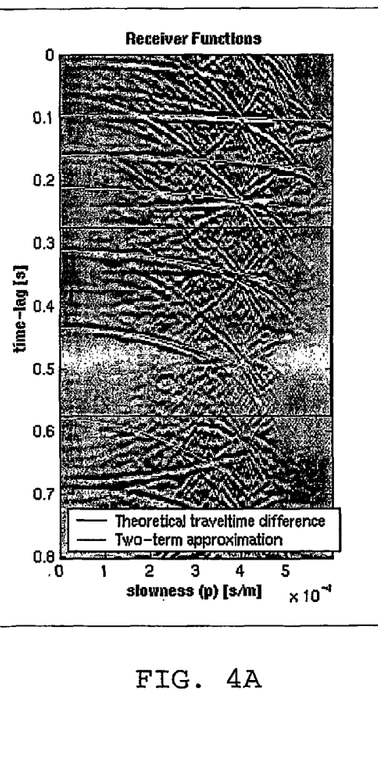
FIG. 4A are receiver functions obtained by stabilised deconvolution of the upgoing P-waves out of the upgoing PS-converted waves shown in FIG. 3. The theoretical traveltime differences between the PS-converted waves and primary P-reflections are calculated by ray-tracing and are shown in blue. The two-term approximation (eq. 5) using exact pseudo rms-velocities is shown in cyan. The black box denotes the area which is shown in detail in FIG. 5A.
Figure 4B:
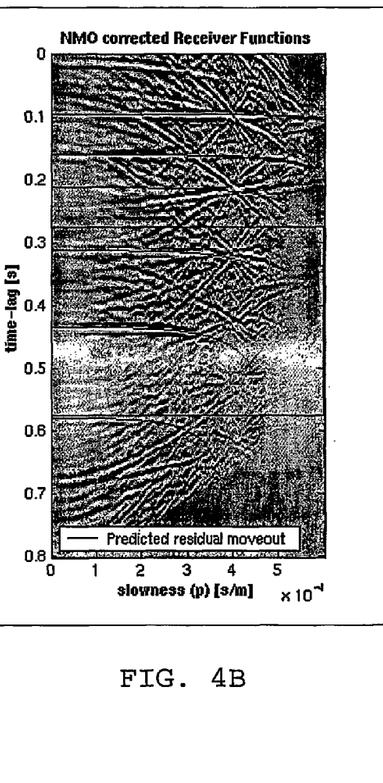
FIG. 4B are NMO corrected receiver functions using the two-term approximation (eq. 5) and the linearly interpolated exact pseudo rms-velocity model. The predicted residual moveout is shown in blue. The black box denotes the area which is shown in detail in FIG. 5B.

The receiver functions, calculated by stabilised deconvolution, for this data are shown in FIG. 4A. The theoretical traveltime differences between the PS-converted waves and primary P-reflections are calculated by ray-tracing and are shown in blue. The two-term approximation (eq. 5) using exact pseudo rms-velocities is shown in cyan. It is clear that the two-term approximation is exact at zero slowness (p=0 s/m). Moreover, the accuracy decreases with both increasing slowness and depth. This is because the velocity increases with depth and the accuracy of the expansion is directly related to the product of the velocity and the slowness in each layer. In FIG. 4B, the receiver functions have been NMO corrected using the two-term approximation and the linearly interpolated pseudo rms-velocities. It is clear that all identified events have been significantly flattened. The predicted residual moveout, calculated by extracting the two-term approximation from the ray-traced (exact) traveltime differences, is shown in blue.

Figure 5A:
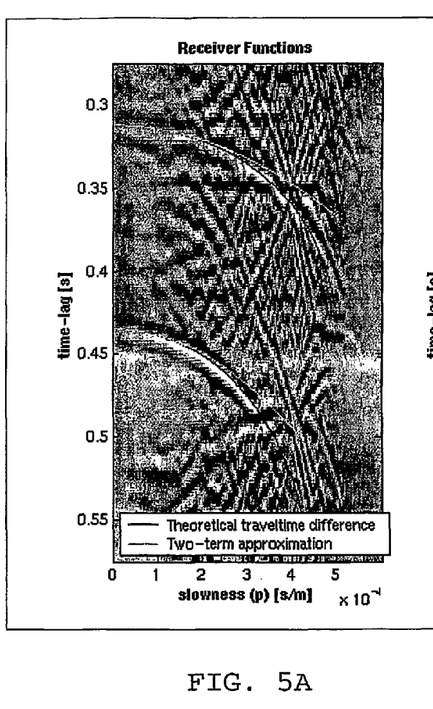
FIG. 5A is a zoom-in on the area denoted by the black box in FIG. 4A. The two main events correspond to the relative moveout between the P-reflection and its PS-conversion at the fifth and sixth interface. It is showing receiver functions obtained by stabilised deconvolution of the upgoing P-waves out of the upgoing PS-converted waves shown in FIG. 3. The theoretical traveltime differences between the PS-converted waves and primary P-reflections are calculated by ray-tracing and are shown in blue. The two-term approximation (eq. 5) using exact pseudo rms-velocities is shown in cyan.
Figure 5B:
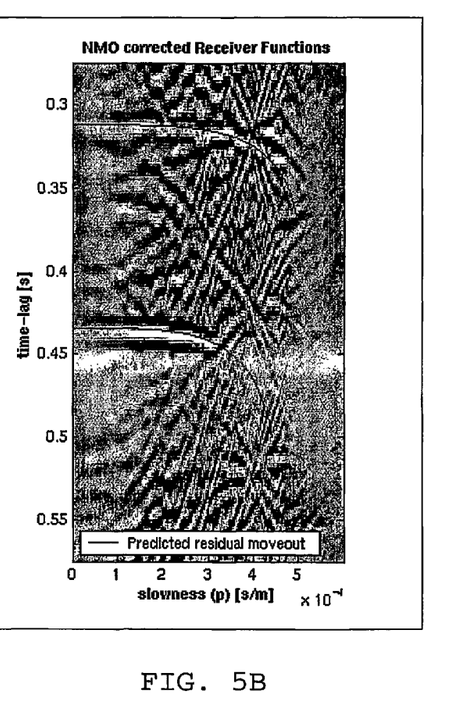
FIG. 5B is a zoom-in on the area denoted by the black box in FIG. 4B. The two main events correspond to the relative moveout between the P-reflection and its PS-conversion at the fifth and sixth interface. It is showing NMO corrected receiver functions, using the two-term approximation and the linearly interpolated exact pseudo rms-velocity model. The predicted residual moveout is shown in blue.

In FIG. 5, the area denoted by the black boxes in FIG. 4s is shown in detail. The two main events correspond to the relative moveout between the P-reflection and its PS-conversion at the fifth and sixth interface. Again, it is clear that the events have been significantly flattened using the two-term approximation.

Note that the moveout correction using the two-term approximation obviously requires a pseudo rms-velocity model. In the example here, the exact pseudo rms-velocities is calculated using eq. 6b and Table 1. The two-term approximation of the traveltime difference makes the problem amendable to velocity analysis (Taner and Koehler, 1969) by reducing the number of parameters to two.

TABLE 1

Medium properties of the 6-layer over a halfspace model used in the reflectivity calculations.

| Layer | P-velocity [m/s] | S-velocity [m/s] | Depth [m] |
| --- | --- | --- | --- |
| 1 | 1650 | 400 | 0 |
| 2 | 1775 | 700 | 50 |
| 3 | 1900 | 950 | 125 |
| 4 | 2000 | 1000 | 225 |
| 5 | 2250 | 1125 | 425 |
| 6 | 2750 | 1375 | 700 |
| 7 | 3000 | 1500 | 1300 |

Example 2

Moveout Approximations of the Traveltime Difference as a Function of the Difference in Horizontal Distance Traveled In this example we use the exactly the same reflectivity data as was used in example 1, with the exception that the input data is not transformed to the time-slowness ($\tau$,p) domain. Instead, as proposed in the section on series approximation of the traveltime difference as function of the difference in horizontal difference, we calculate a new type of receiver function formed by two-dimensional (2D) deconvolution of the vertical component (upgoing P-waves) out of the radial component (upgoing S-waves) data in the (x,t) domain. Two-dimensional deconvolution in the (x,t) domain is equivalent to division of each point in the corresponding frequency-wavenumber (f,k) domain. Hence, individual plane PS-wave components are shifted in time and space relative to the arrival time and location of the P-wave components with the same frequency and (horizontal) wavenumber.

Figure 6A:
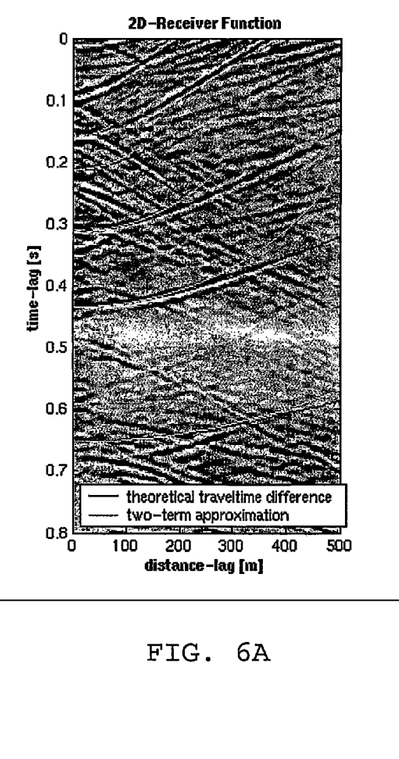
FIG. 6A is a receiver functions calculated by two-dimensional stabilised deconvolution of (x,t) domain vertical component data out of the corresponding radial component data. This 2D-Receiver Function gives the traveltime difference between a P-wave reflection and its PS-conversion as a function of the difference in the horizontal travel distance. The theoretical traveltime differences, calculated by raytracing, are indicated in blue. The two-term approximation, calculated from eq. 20 and the coefficients given in 25a,b using exact medium properties, is indicated in cyan.
Figure 6B:
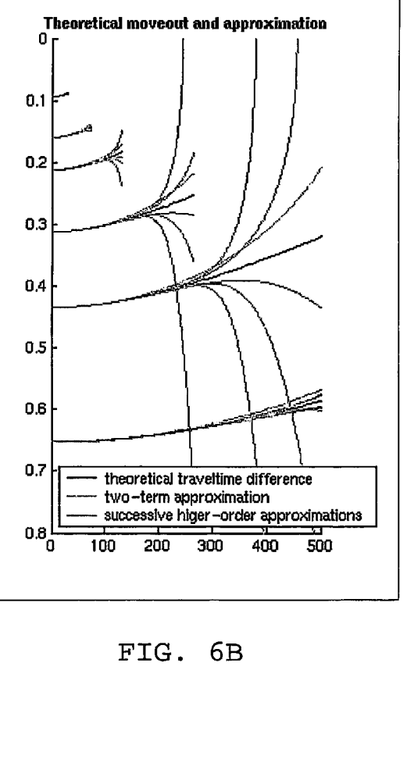
FIG. 6B shows again theoretical traveltime differences and the two-term approximation are indicated in blue and cyan respectively. Successive higher order approximations are shown in green.

The result of this 2D-deconvolution is shown in FIG. 6A. The theoretical traveltime differences as function of the difference in horizontal travel distance, calculated by ray-tracing, are shown for each interface in blue. The two-term approximation, calculated from eq. (20) using coefficients eq. (27a,b) and exact medium properties, is shown in cyan. FIG. 6B shows (in green colour) successive higher-order approximations. The coefficients for the higher-order terms have been calculated from eq. (25), repeatedly making use of eq. (22), (24) and (26). Although it is not clear from FIG. 6 (or FIG. 7), closer inspection shows that although the higher-order approximations are more accurate for small slownesses, they break down at a lower slowness. This has to do with the asymptotic nature of the series approximation.

Although the 2D-receiver functions in FIG. 6A contain a lot of secondary events which cannot be explained by the ray-traced theoretical traveltime differences for each of the six interfaces, it is clear that those events that can be related to the interplay of a primary P-reflection and its PS-conversion, are approximated reasonably by the two-term approximation, especially at small-slowness.

Figure 7A:
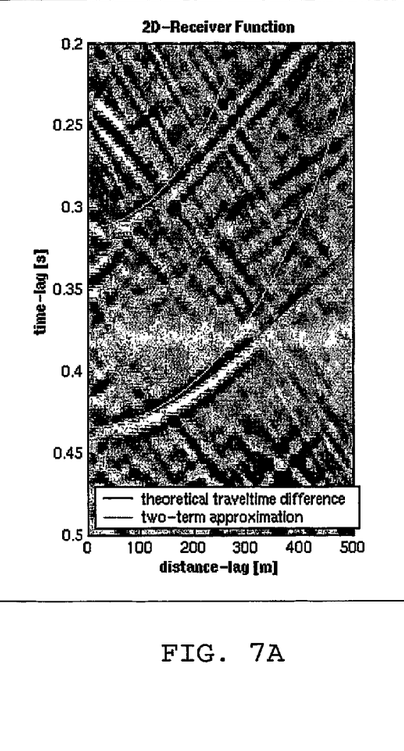
FIG. 7A is a zoom-in on the 2D-Receiver Functions and moveout approximations shown in FIG. 6A. The two main events give information about the difference in traveltime between the P-reflection and its PS-conversion at the fifth and sixth interface as a function of the difference in horizontal distance traveled. Theoretical traveltime differences and the two-term approximation (eq.20) are indicated in blue and cyan respectively.
Figure 7B:
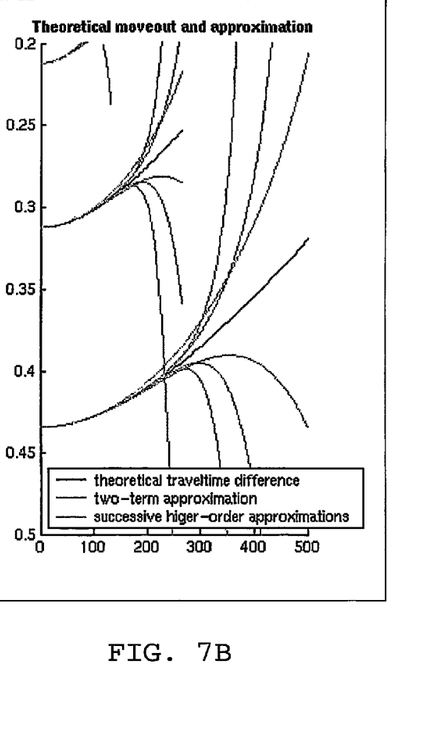
FIG. 7B is a zoom-in on the 2D-Receiver Functions and moveout approximations shown in FIG. 6B. Successive higher order approximations are also shown, in green.

In FIG. 7A, two events from the 2D-receiver function corresponding to the fifth and sixth interface, are shown in detail. FIG. 7B shows the corresponding zoom-in on the theoretical, two-term and higher-order traveltime difference curves.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of processing seismic signals to determine properties of multiple layers of earth using the steps of:
obtaining seismic signals including unchanged modes and converted modes of seismic signals from a plurality of receivers;
identifying receiver functions within the acoustic signals;
analyzing said receiver functions for velocity or moveout characteristics;
using the result of said analyzing step to determine properties of multiple layers of earth located below said receivers, wherein the multiple layers of earth include significant discontinuities above a converting interface at which a seismic signal is at least partially converted from one mode into another.

2. The method of claim 1 wherein the plurality of receivers include receivers responsive to p-waves and receivers responsive to s-waves.

3. The method of claim 1 wherein the seismic signals include P-waves and PS-converted wave modes.

4. The method of claim 1 wherein the receiver functions are two-dimensional receiver functions including vertical components of seismic signals and radial components of seismic signals.

5. The method of claim 1 wherein the receiver functions are two-dimensional receiver functions determined by a two-dimensional deconvolution or crosscorrelation of vertical components of the acoustic signals and radial components of the seismic signals.

6. The method of claim 1 wherein the analyzing step includes the step of determining traveltime differences or an approximation of the traveltime differences between different modes of the seismic signals.

7. The method of claim 1 wherein the analyzing step includes the step of determining traveltime differences or an approximation of the traveltime differences between different modes of the seismic signals emerging at a single receiver location.

8. The method of claim 1 wherein the analyzing step includes the step of determining traveltime differences or an approximation of the traveltime differences between different modes of the seismic signals originating from a single location below the multiple layers.

9. The method of claim 6 wherein the step of determining an approximation of the traveltime differences between different modes of the seismic signals includes the step of calculating the traveltime differences in dependence of powers of slowness.

10. The method of claim 6 wherein the step of determining an approximation of the traveltime differences between different modes of the seismic signals includes the step of calculating the traveltime differences in dependence of powers of horizontal distance.

11. The method of claim 10 wherein the step of determining an approximation of the traveltime differences between different modes of the seismic signals includes the step of calculating the squared traveltime differences in dependence of powers of horizontal distance.

12. The method of claim 6 wherein the step of determining an approximation of the traveltime differences between different modes of the seismic signals includes the step of calculating the traveltime differences in dependence of powers of slowness.

13. The method of claim 1 wherein the step of determining properties of multiple layers of earth located below said receivers includes the step of determining at least one of the parameters of p-wave velocity, s-wave velocity, height/depth, or density of each of said multiple layers.

14. The method of claim 1 wherein the step of determining properties of multiple layers of earth located below said receivers includes the step of using a relation which express the product of p-wave velocity and s-wave velocity in a layer as functions of moveout characteristics and/or traveltime differences at the interface of said layer.

15. The method of claim 1 wherein the step of determining properties of multiple layers of earth located below said receivers includes the step of using a Dix-Krey type of relation.

16. The method of claim 1 wherein the step of determining properties of multiple layers of earth located below said receivers includes the step of using travel time differences and differences in horizontal travel to provide two constraints in a step of determining p-wave velocity, s-wave velocity, depth/height or density of each of said multiple layers.

17. The method of claim 1 further including the step of correcting the receiver functions for normal moveout (NMO).

18. The method of claim 1 further including the step of migrating the receiver functions.

19. The method of claim 1 wherein the analyzing step includes the use of a coherence measure.

* * * * *